G. W. BUNTING.
MECHANICAL MOTOR.
APPLICATION FILED DEC. 7, 1910.
1,030,566.
Patented June 25, 1912.
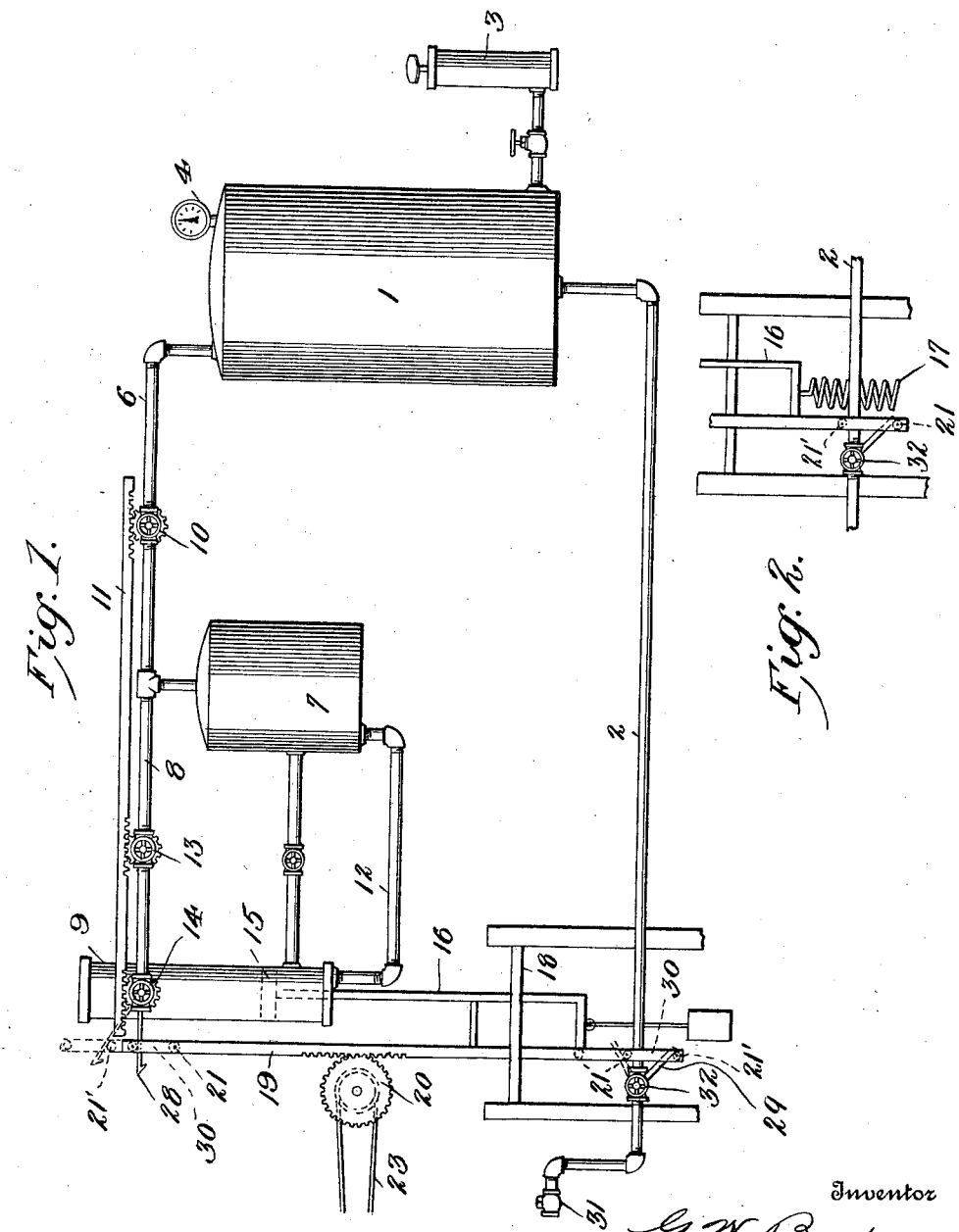

UNITED STATES PATENT OFFICE.

GEORGE W. BUNTING, OF OCEAN CITY, MARYLAND.

MECHANICAL MOTOR.

1,030,566.

Specification of Letters Patent.  Patented June 25, 1912.

Application filed December 7, 1910. Serial No. 596,118.

*To all whom it may concern:*

Be it known that I, GEORGE W. BUNTING, a citizen of the United States, residing at Ocean City, in the county of Worcester and State of Maryland, have invented certain new and useful Improvements in Mechanical Motors, of which the following is a specification.

This invention relates to mechanical motors, and is primarily designed to provide a mechanism which may be operated by fluid power for imparting reciprocating movement to the power or driving parts.

With the above and other objects in view this invention consists in the construction, combination and arrangement of the parts all as hereinafter more fully described.

Figure 1 is a view disclosing the present invention and illustrating how the different parts are connected up; Fig. 2 is a modification which may be used to serve the purpose of the weight.

Referring more particularly to the drawings, 1 designates an air reservoir having communication with any suitable air supply by the pipe 2 or with an auxiliary air compressor 3, the latter being operated preferably by hand for producing the required amount of pressure to start the motor. This tank or reservoir 1 may have a pressure gage 4. Leading from the tank 1 is a pipe 6 having a communication with the liquid reservoir 7 and also an extension pipe 8 by which communication is had with the cylinder 9 for the purposes hereinafter more fully described. On the pipe 6 between the air reservoir and the liquid reservoir is a valve 10 having a pinion by which the valve may be operated by the rack member 11 to be hereinafter described. Besides the communication of the liquid reservoir with the cylinder through the pipe 8 it has a connecting pipe 12 secured to the bottoms of said reservoir and cylinder. On the pipe 8 is a valve 13 for shutting off communication between the liquid reservoir and the cylinder, and on the upper portion of the cylinder 1 is a valve 14 communicating with the atmosphere, said valves being constructed and provided with pinions similar to the valve 10. These three valves are operated simultaneously by the rack member 11, the latter being slidably mounted in any desired manner. A plunger or piston 15 is located within the cylinder 9, the former having a piston rod 16 carried thereon, the opposite extremity of said rod being secured to a weight 17 or a coiled spring of the desired strength. This spring 17 is rigidly secured to some stationary object. The rod 16 may be guided in any usual manner as for instance by the cross member 18, as illustrated in the drawings. Rigidly secured to the rod 16 is an operating member 19, said member being provided with a rack portion for operating the gear 20. This operating member is provided at each terminal with slots 30. Mounted within the slotted portions at each terminal of said slots are friction rollers 21 and 21'. A check valve 31 may be provided in the pipe 2 adjacent to the air supplying means. A valve 32 is provided in the pipe 2 also cutting off communication with the air reservoir 1. A lever 29 is provided for operating the valve, said lever extending through the slot provided in the lower terminal of the operating member 19. A similar lever is provided to operate the valve 14, said lever protruding through the slot provided in the upper terminal of said operating member. The air passes through pipe 6, the valve 10 being open and the valve 13 being closed, into the liquid reservoir 7, said reservoir being partly filled with liquid such as may be desired. When the compressed air acts upon the liquid it forces said liquid through the pipe 12 into the cylinder 9 forcing the piston 15 upwardly and raising the rod 16 and operating member 19 against the tension of the spring 17. In this operation the valve 14 is open permitting the air in the cylinder above the piston to escape. As the piston ascends the operating member 19 strikes against the levers 29 and 28 shutting off the valves 10 and 14 and opening the valves 13 and 32, said valves 13, 14 and 10 being operated simultaneously by the rack member 11 as before stated. With the air pressure cut off from the liquid reservoir 7 the tension to which the spring 17 is put to, operates upon the piston 15 by drawing the latter downwardly and forcing the liquid back into the reservoir 7, the air used and left in the liquid reservoir to escape through the pipe 8 and the valve 14 of the cylinder 9. As the rod 16 and the operating member 19 descend, the gear 20 which is in mesh with the rack portion of said operating member is revolved. Just before completing the downward stroke the friction rollers mounted on the operating member come in contact with the levers 29 and 28 operating the same to close the valves 13 and 32, and opening the valves 10 and 14.

Instead of weight or the spring 17 being used in the construction any other structure may be provided. The gear 20 may be connected by any suitable means, such as a belt 23, for actuating certain mechanisms such as a saw mill. Since the fluid from the reservoir 1 is withdrawn intermittently, the valve 32 permits of the storing of the fluid in the same manner, and thereby causes the pressure to remain approximately the same.

Having thus fully described my invention, what is claimed as new is:

In a motor of the class described, an air reservoir, a liquid reservoir connected to said air reservoir, a cylinder having double communication with said liquid reservoir a piston carrying a piston rod slidably mounted in said cylinder, an operating member rigidly secured to said piston rod, said operating member being provided with slots, valves interposed between said cylinder and said liquid reservoir, and the latter and said air reservoir, means for opening and cutting off communication of the inside of said cylinder with the atmosphere, a member secured to said last mentioned means and located in said slotted portion of the operating member adapted to be operated by the latter, a gear adapted to be operated by said operating member, and means carried by the piston rod for drawing the piston downwardly, as herein set forth.

In testimony whereof I affix my signature in presence of two witnesses.

GEORGE W. BUNTING.

Witnesses:
 HENRY E. DAVIS, Jr.,
 LEMUEL WYATT.

---

Copies of this patent may be obtained for five cents each, by addressing the "Commissioner of Patents, Washington, D. C."